US009757790B2

(12) United States Patent
McCarty et al.

(10) Patent No.: US 9,757,790 B2
(45) Date of Patent: Sep. 12, 2017

(54) PRESS SYSTEM WITH VACUUM PORT ASSEMBLY

(71) Applicant: STOLLE MACHINERY COMPANY, LLC, Centennial, CO (US)

(72) Inventors: Patrick K. McCarty, Dayton, OH (US); Aaron E. Carstens, Centerville, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

(21) Appl. No.: 15/373,997

(22) Filed: Dec. 9, 2016

(65) Prior Publication Data

US 2017/0100764 A1   Apr. 13, 2017

Related U.S. Application Data

(62) Division of application No. 13/911,532, filed on Jun. 6, 2013, now Pat. No. 9,550,224.

(60) Provisional application No. 61/817,488, filed on Apr. 30, 2013.

(51) Int. Cl.
B21D 51/26 (2006.01)
B21D 43/18 (2006.01)

(52) U.S. Cl.
CPC ......... B21D 51/2692 (2013.01); B21D 43/18 (2013.01)

(58) Field of Classification Search
CPC ... B21D 43/18; B21D 51/2692; B21D 51/446
See application file for complete search history.

(56) References Cited

U.S. PATENT DOCUMENTS

2008/0253867 A1\* 10/2008 Barge ................ B65G 21/2036
414/217

FOREIGN PATENT DOCUMENTS

| CN | 2785754 A2 | 6/2006 |
|---|---|---|
| CN | 202239339 U | 5/2012 |
| CN | 202536538 U | 11/2012 |
| DE | 33 43 811 A1 | 6/1985 |

(Continued)

OTHER PUBLICATIONS

European Patent Office, Extended European Search Report for European Patent Application No. 141580809.4, dated Aug. 14, 2014.

(Continued)

Primary Examiner — Debra Sullivan
(74) Attorney, Agent, or Firm — Eckert Seamans Cherin & Mellott, LLC; Grant E. Coffield; John P. Powers

(57) ABSTRACT

A vacuum port assembly is provided for a press system including a die assembly and a transfer assembly. The transfer assembly includes a conveyor belt, a vacuum manifold coupled to the die assembly, and an airflow generator. The conveyor belt includes a plurality of holes for receiving and moving shells in a plane with respect to the die assembly. The vacuum port assembly includes at least one port member including inlet and outlet ends. The inlet end has a mounting portion for removably coupling the port member to the vacuum manifold. The outlet end is in fluid communication with the airflow generator, thereby establishing fluid communication between the airflow generator and the vacuum manifold. The inlet end extends outwardly from the vacuum manifold generally perpendicular with respect to the plane of the conveyor belt.

9 Claims, 7 Drawing Sheets

(56) References Cited

FOREIGN PATENT DOCUMENTS

EP    1 980 505  A2   10/2008
EP    2 409 938  A2   1/2012

OTHER PUBLICATIONS

Chinese Office Action dated Oct. 9, 2016 for Chinese Application No. 201310184609.4. Corresponding Chinese Patent Application. (English Translation and Chinese Language).
Notice of Allowance With Cited Art, Corresponding Parent U.S. Appl. No. 13/911,532, dated Jun. 6, 2013.
Information Disclosure Statements Filed in Corresponding Parent U.S. Appl. No. 13/911,532.
List of Cited References Filed in Corresponding Parent U.S. Appl. No. 13/911,532.
Chinese Office Action dated May 19, 2017 for Chinese Application No. 201310184609.4. Corresponding Chinese Patent Application. (English Translation and Chinese Language).

* cited by examiner

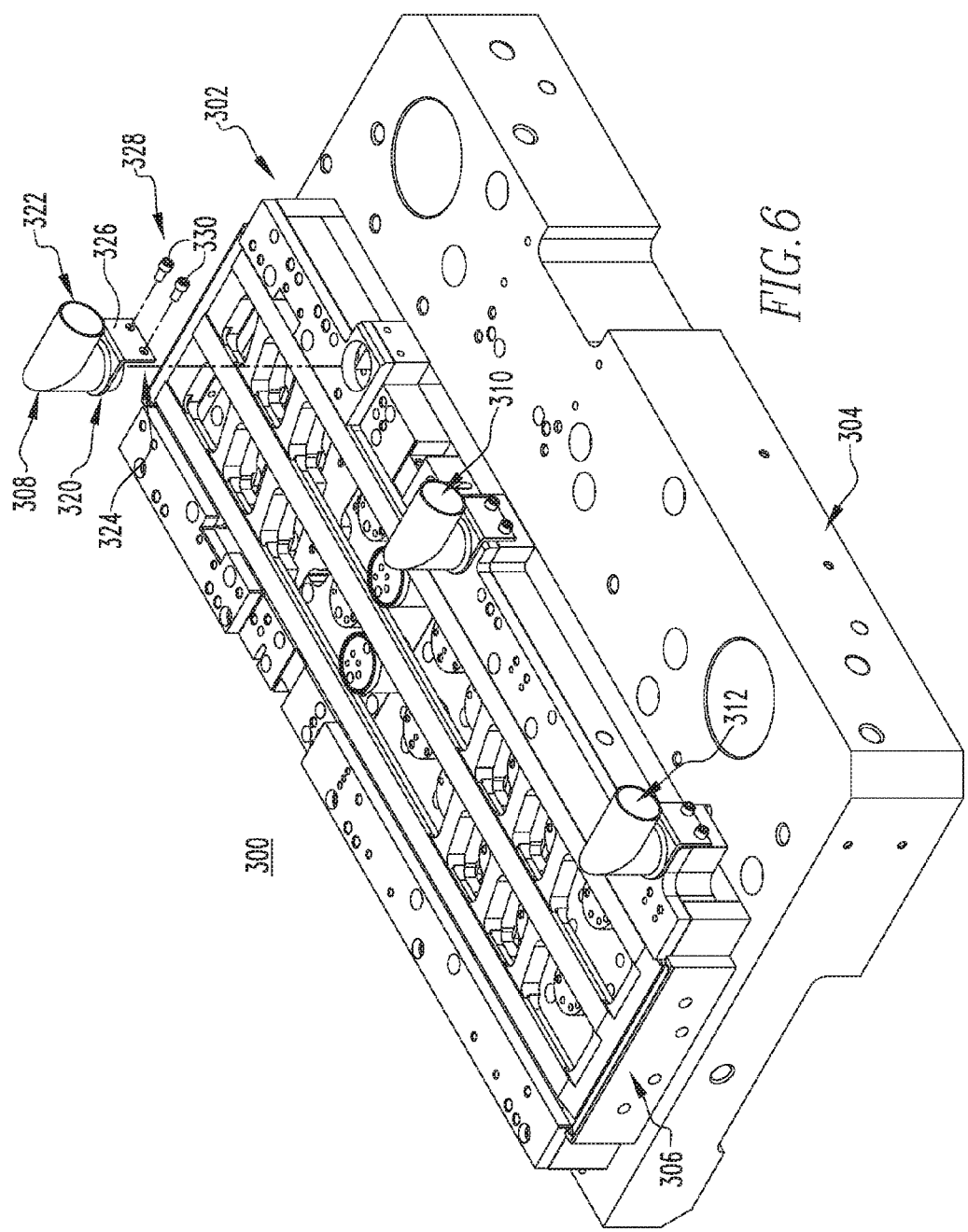

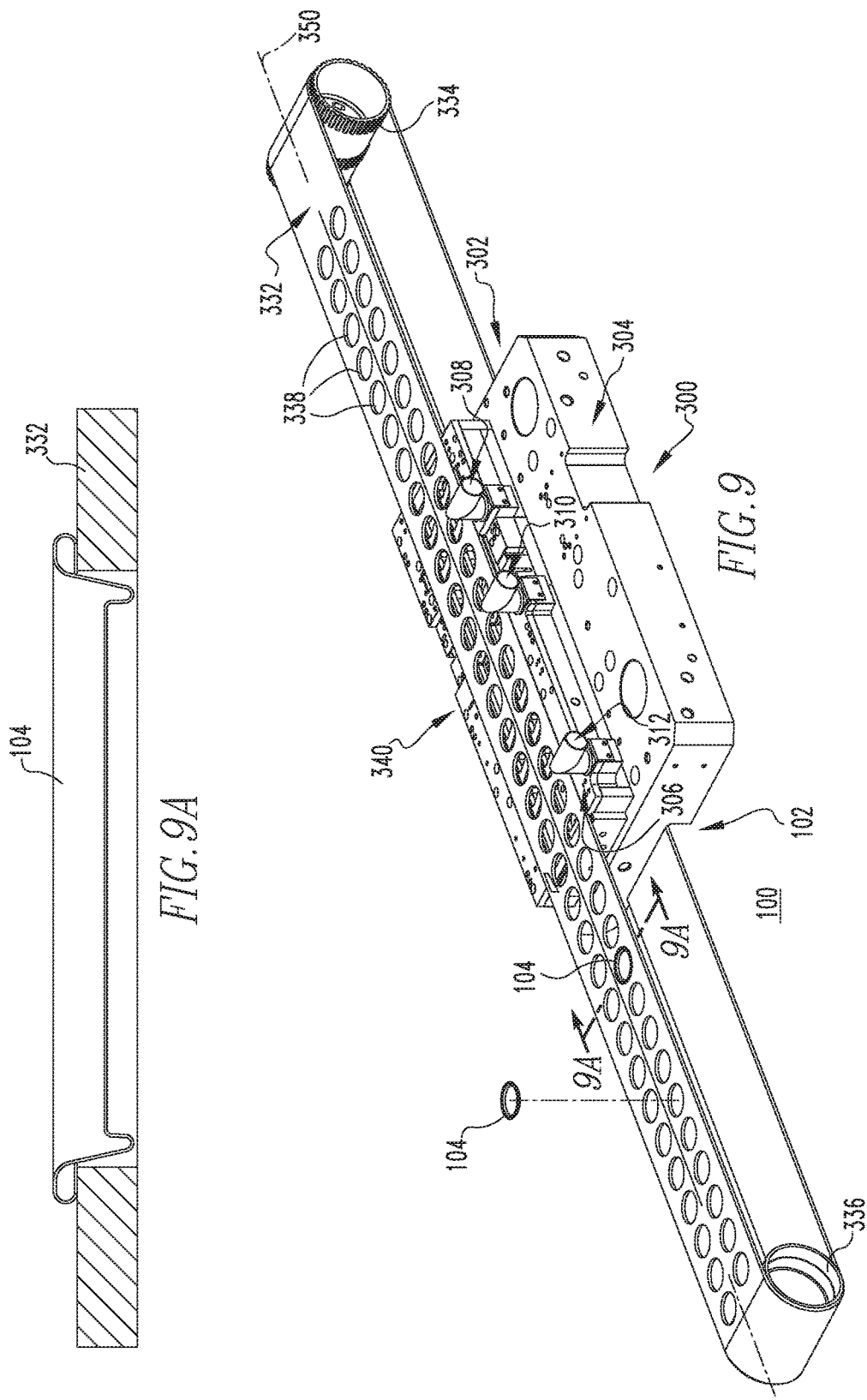

PRESS SYSTEM WITH VACUUM PORT ASSEMBLY

CROSS-REFERENCE TO RELATED APPLICATIONS

This application claims the benefit of U.S. patent application Ser. No. 13/911,532, filed Jun. 6, 2013, entitled "PRESS SYSTEM AND VACUUM PORT ASSEMBLY THEREFOR," which claims the benefit of U.S. Provisional Patent Application Ser. No. 61/817,488, filed Apr. 30, 2013, entitled "PRESS SYSTEM AND VACUUM PORT ASSEMBLY THEREFOR," the contents of which are hereby incorporated by reference as if fully set forth herein.

BACKGROUND

Field

The disclosed concept pertains generally to press systems and, in particular, to press systems such as, for example, conversion presses. The disclosed concept also pertains to vacuum port assemblies for press systems.

Background Information

Press systems, such as for example, conversion presses, are used in the can-making industry to form (e.g., convert and finish) partially formed ends or shells into fully finished can ends or lids such as, for example, easy open ends (EOEs) for food or beer/beverage containers.

Typically, the shells enter the press on a conveyor belt where they are progressively formed by a number of die assemblies. It is necessary to establish and maintain the desired position of the shells throughout the loading and metal forming processes in the press system, in order to properly form the EOEs. Some press systems employ vacuum pressure to hold and maintain the shells during these processes, wherein the vacuum pressure is typically provided using a plurality of airflow generators (e.g., regenerative blowers), and a network of conduits and/or ducting that is connected to a vacuum manifold on each die assembly via a number of vacuum ports on the side of the vacuum manifold, the ends of the vacuum manifold, and/or from beneath the die assembly.

There are a variety of disadvantages with all of these known vacuum port configurations. Among other problems, porting from beneath the die assembly requires machining of the lower die shoe to form an integral duct through the die shoe, and presents access problems during maintenance cycles. This configuration is also susceptible to gravity-related issues, such as airflow restriction or blockage due to the accumulation of debris at or about the port or integral die shoe duct. Porting through the sides of the vacuum manifold also poses maintenance problems, and airflow restrictions due to size limitations. That is, the port size (e.g., diameter) is restricted by the height or available space on the side of the vacuum manifold. This height limitation necessitates use of either smaller diameter ports, or ports having a transitioned structure (e.g., smaller inlet tapering to a larger outlet). This can restrict airflow and negatively impact the differential pressure capability of the airflow generator.

FIG. 1 shows an example die assembly 2 including a lower die shoe 4, and a vacuum manifold 6 mounted on the lower die shoe 4. The die assembly 2 includes three vacuum ports 8,10,12. A first vacuum port 8 extends outwardly from the lower die shoe 4 and is in fluid communication with a conduit or channel 14 (FIG. 2) that is machined through the lower die shoe 4 creating an integral passageway to the underside of the vacuum manifold 6, as shown in FIG. 2. The other two vacuum ports 10,12 are both substantially identical and extend outwardly from the side of the vacuum manifold 6 at opposite ends of the vacuum manifold 6, as shown in FIG. 1.

As shown in the section view of FIG. 2, the inner diameter 16 of the lower vacuum port 8 is generally the same as the diameter 18 of the integral conduit 14. That is, the diameters 16,18 are generally restricted by the space available for machining the integral conduit 14 in the lower die shoe 4. Additionally, the integral conduit 14 is disposed internal to the die shoe 4 and at a low point making it susceptible to the aforementioned access and gravity-related airflow problems.

FIG. 3 shows a section view of vacuum port 12, which is substantially similar to vacuum port 10 (FIG. 1). As shown, the diameter 20 of the inlet end 22 is restricted in size by the height 24 of the vacuum manifold 6. Thus, it is necessary to provide the vacuum port 12 with the tapered configuration shown, wherein the outlet end 26 tapers to the smaller inlet end 22, in order to fit within the restricted available space on the side of the vacuum manifold 6.

There is, therefore, room for improvement in press systems and in vacuum port assemblies therefor.

SUMMARY

These needs and others are met by the disclosed concept, which is directed to a vacuum port assembly for a press system, which among other benefits removably couples a number of improved vacuum port members to a vacuum manifold and enhances functionality and performance.

In accordance with one aspect of the disclosed concept, a vacuum port assembly is provided for a press system. The press system includes a die assembly and a transfer assembly. The transfer assembly includes a conveyor belt, a vacuum manifold coupled to the die assembly, and an airflow generator. The conveyor belt includes a plurality of holes and is structured to receive and move a plurality of shells in a plane with respect to the die assembly. The vacuum port assembly comprises: at least one port member including an inlet end and an outlet end, the inlet end having a mounting portion, the mounting portion being structured to removably couple the at least one port member to the vacuum manifold, the outlet end structured to be in fluid communication with the airflow generator, in order that the at least one port member establishes fluid communication between the airflow generator and the vacuum manifold. The inlet end is structured to extend outwardly from the vacuum manifold generally perpendicular with respect to the plane of the conveyor belt.

As another aspect of the disclosed concept, a press system comprises: a die assembly; a transfer assembly comprising a conveyor belt, a vacuum manifold coupled to the die assembly, an airflow generator, the conveyor belt including a plurality of holes and being structured to receive and move a plurality of shells in a plane with respect to the die assembly; and a vacuum port assembly. The vacuum port assembly comprises at least one port member including an inlet end and an outlet end, the inlet end having a mounting portion, the mounting portion removably coupling the at least one port member to the vacuum manifold, the outlet end being in fluid communication with the airflow generator, in order that the at least one port member establishes fluid communication between the airflow generator and the vacuum manifold. The inlet end extends outwardly from the vacuum manifold generally perpendicular with respect to the plane of the conveyor belt.

BRIEF DESCRIPTION OF THE DRAWINGS

A full understanding of the disclosed concept can be gained from the following description of the preferred embodiments when read in conjunction with the accompanying drawings in which:

FIG. 6 is an isometric view of a portion of a die assembly and vacuum port assembly therefor, in accordance with another aspect of the disclosed concept;

FIG. 9 is an isometric view of a portion of a transfer assembly for a press system, showing the portion of the die assembly and vacuum port assembly therefor of FIG. 6;

FIG. 9A is a section view taken along line 9A-9A of FIG. 9; and

DESCRIPTION OF THE PREFERRED EMBODIMENTS

Figure 1:
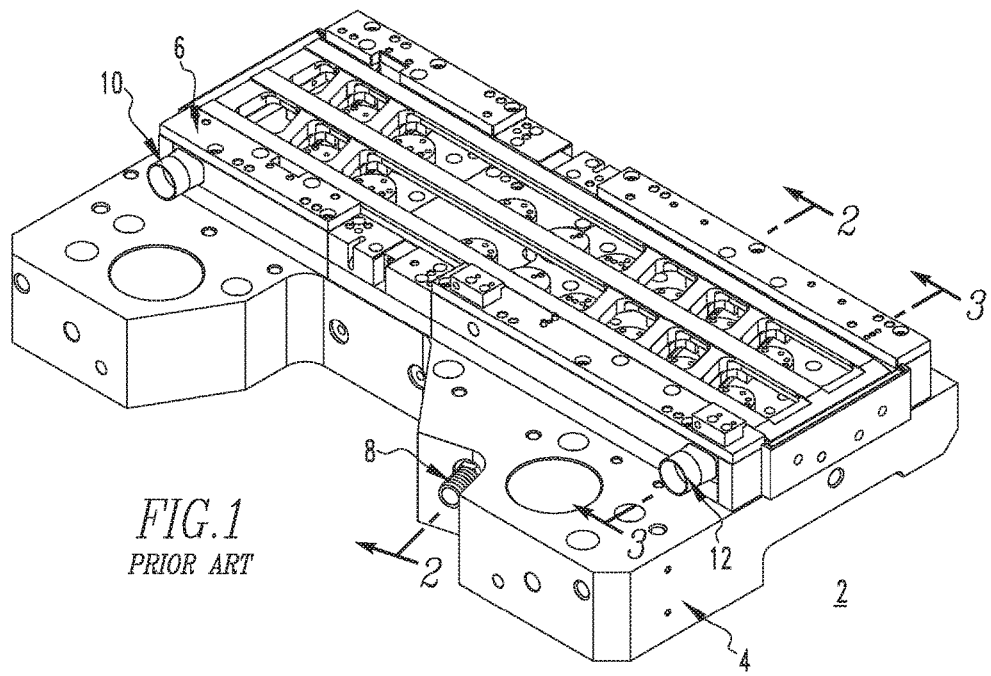
FIG. 1 is an isometric view of a prior art die assembly and vacuum ports therefor.
Figure 2:
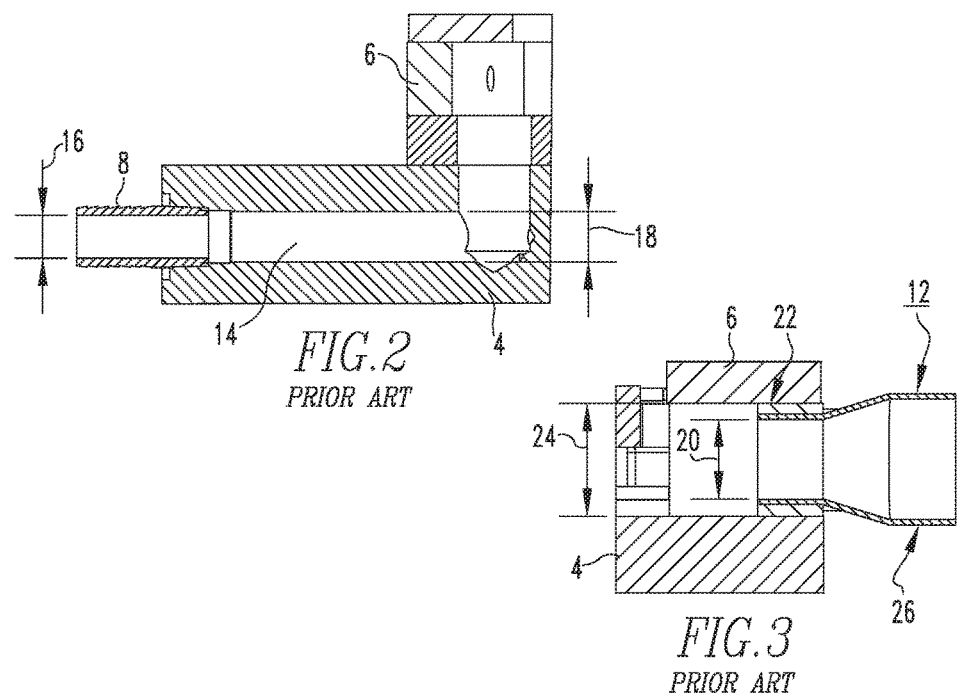
FIG. 2 is a section view taken along line 2-2 of FIG. 1.
Figure 3:
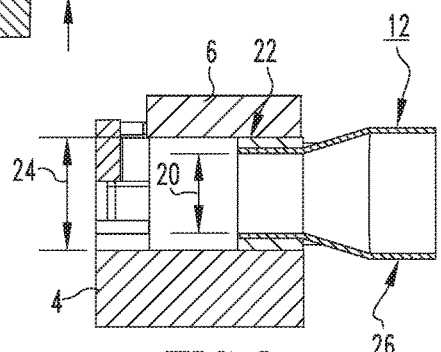
FIG. 3 is a section view taken along line 3-3 of FIG. 1.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, left, right, upward, downward, top, bottom upper, lower and derivatives thereof relate to the orientation of the elements shown in the drawings and are not limiting upon the claims unless expressly recited therein.

As employed herein, the term "can" refers to any known or suitable container, which is structured to contain a substance (e.g., without limitation, liquid; food; any other suitable substance), and expressly includes, but is not limited to, beverage cans, such as beer and soda cans, as well as food cans.

As employed herein, the term "can end" refers to the lid or closure that is structured to be coupled to a can, in order to seal the can.

As employed herein, the term "can end shell" is used substantially interchangeably with the term "can end." The "can end shell" or simply the "shell" is the member that is acted upon and is converted by the disclosed tooling (e.g. die assemblies) to provide the desired can end.

As employed herein, the terms "tooling," "tooling assembly" and "tool assembly" are used substantially interchangeably to refer to any known or suitable tool(s) or component(s) used to form (e.g., without limitation, stretch) shells in accordance with the disclosed concept.

As employed herein, the term "fastening mechanism" refers to any suitable connecting or tightening mechanism expressly including, but not limited to, rivets, pins, rods, clamps and clamping mechanisms, screws, bolls (e.g., without limitation, carriage bolts) and the combinations of bolts and nuts (e.g., without limitation, lock nuts and wing nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 4:
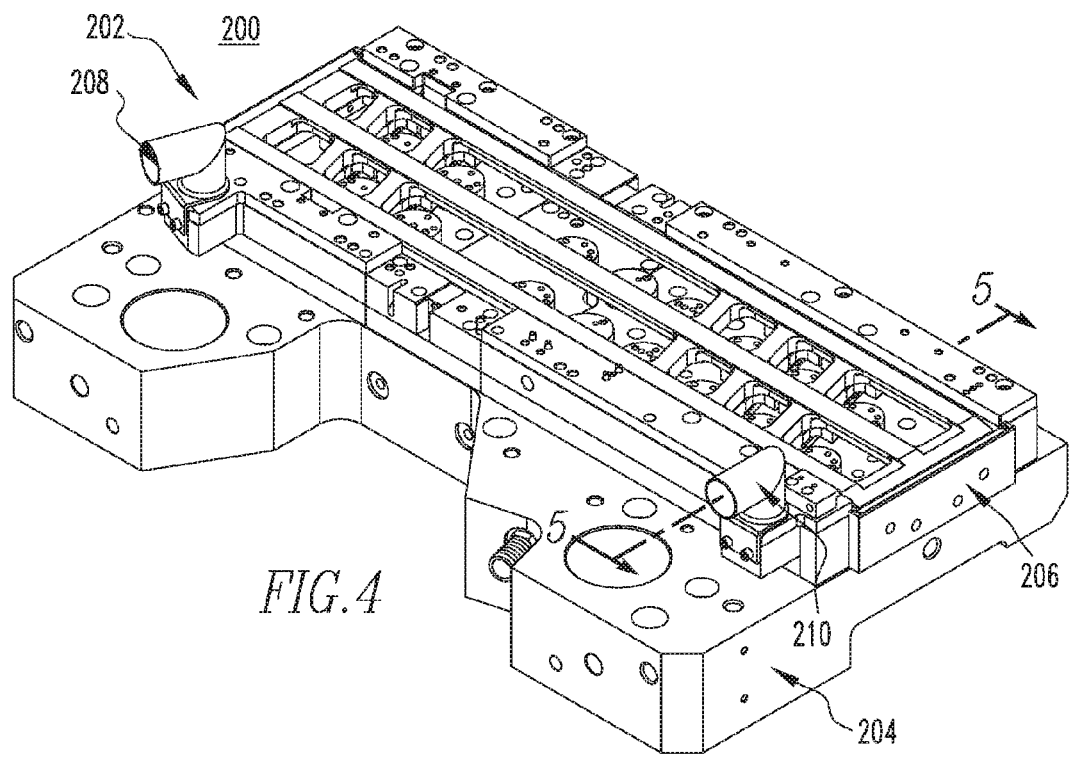
FIG. 4 is an isometric view of a portion of a die assembly and a vacuum port assembly therefor, in accordance with an embodiment of the disclosed concept.
Figure 10:
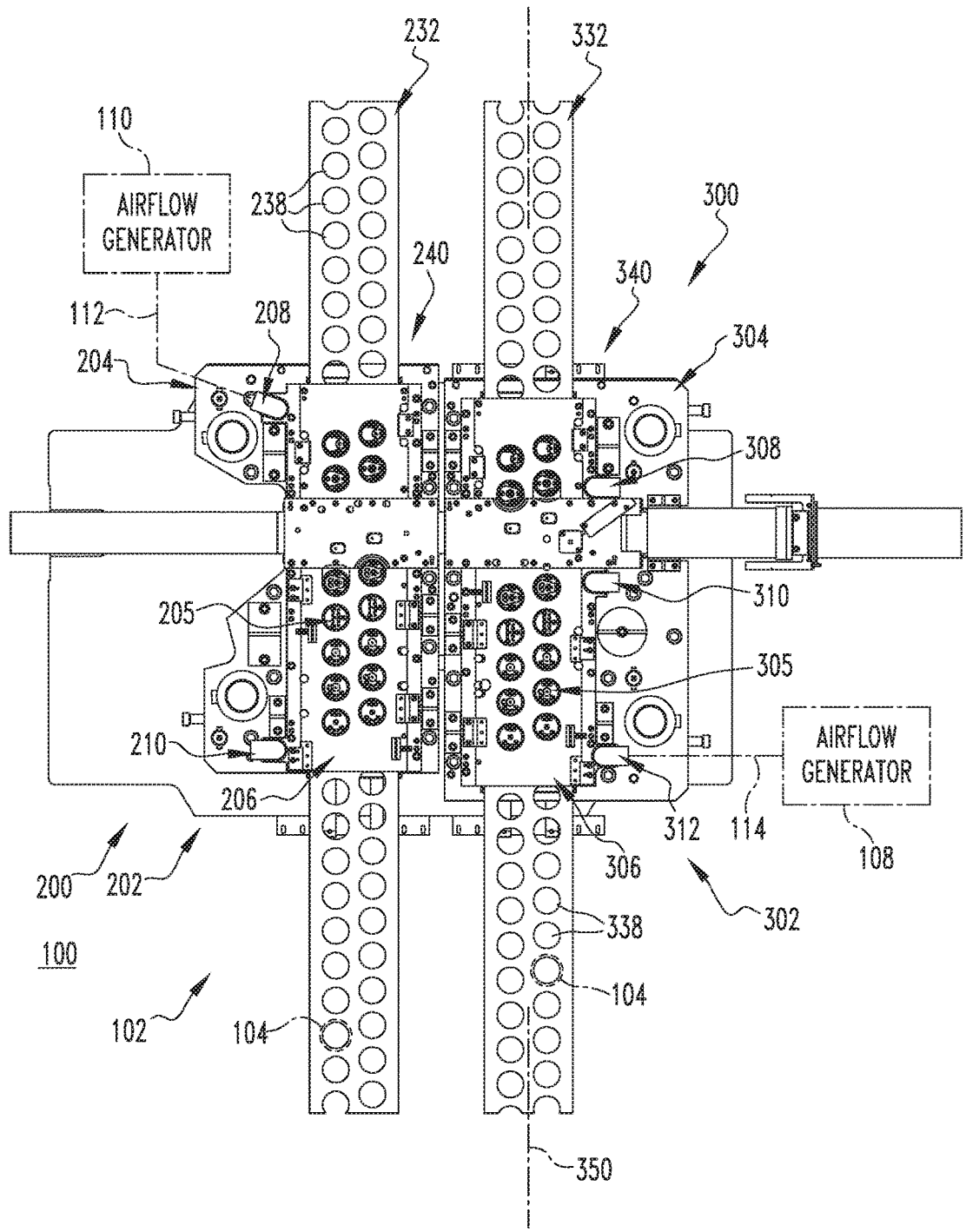
FIG. 10 is a top plan view of a portion of a press system showing the die assemblies and vacuum port assemblies therefor of FIGS. 4 and 6.

FIG. 4 shows a vacuum port assembly 202 for a press system such as, for example and without limitation, a conversion press 100 (partially shown in FIGS. 9 and 10). In the example of FIG. 4, the vacuum port assembly 202 is shown as employed with a die assembly 200, in accordance with a non-limiting embodiment of the disclosed concept. Also shown, is a vacuum manifold 206 coupled to a lower die shoe 204.

The vacuum port assembly 202 of FIG. 4 includes two port members 208,210 that are removably coupled to the vacuum manifold 206. It will be appreciated that the port members 208,210 can be made of any known or suitable material sufficient to withstand operating conditions (e.g., without limitation, steel or aluminum). Additionally, it is within the scope of the disclosed concept for the vacuum port assembly 202 to include any suitable number of port members 208,210 in a wide variety of different configurations (not shown). It will also be appreciated that when more than one port member 208,210 is employed, the port members 208,210 may be substantially identical or they may be different. As will be discussed below, among other benefits, vacuum pressure levels can be improved and maintenance time can be reduced by employing such removable vacuum port members 208,210.

Accordingly, it will be appreciated that, among other benefits, the disclosed vacuum port assembly 202 (see also vacuum port assembly 302 of FIGS. 6, 9 and 10) reduces volumetric flow restrictions, improves vacuum pressure levels, and increases holding forces on the shells (see, for example, shells 104 shown in FIG. 9 and in cross-section in FIG. 9A; see also shells 104, shown in phantom line drawing in FIG. 10).

Figure 5:
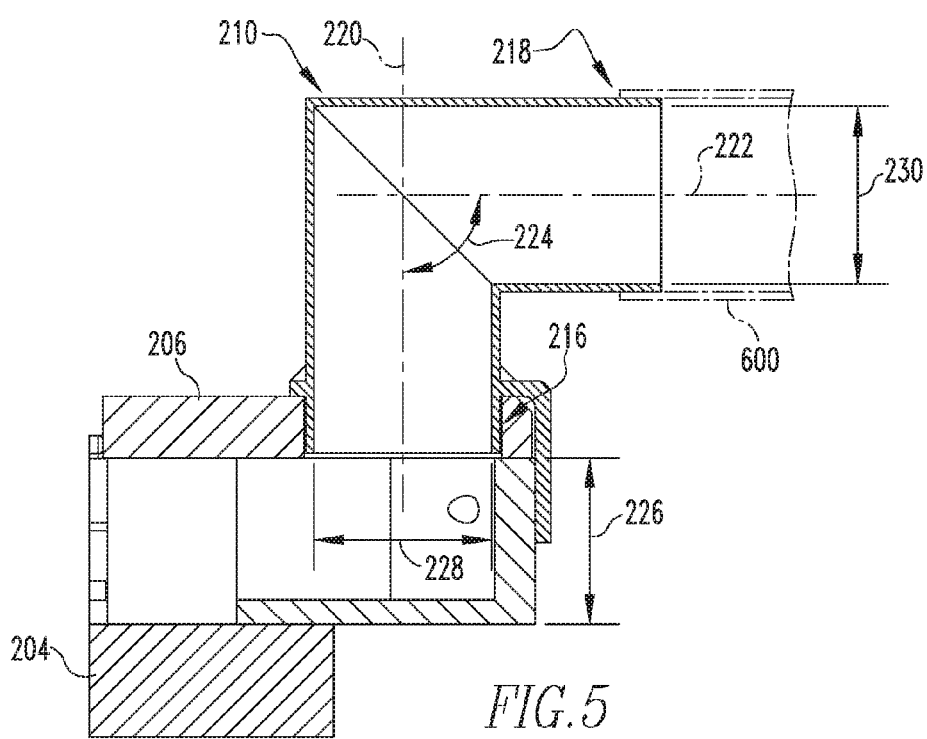
FIG. 5 is a section view taken along line 5-5 of FIG. 4.

FIG. 5 is a section view of the example, non-limiting port member 210, which includes an inlet end 216 and an outlet end 218. The outlet end 218 is structured to be coupled to a suitable conduit 600 (partially shown in phantom line drawing), such as, for example and without limitation, a hose. The conduit 600 is, in turn, coupled to an airflow generator 108,110 (shown in simplified form in FIG. 10) such that in operation, the port member 210 establishes fluid communication between the airflow generator 108,110 (FIG. 10) and the vacuum manifold 206.

The inlet end 216 of the port member 210 has a first longitudinal axis 220 and the outlet end 218 has a second longitudinal axis 222 that forms an angle 224 with respect to the first longitudinal axis 220. The first longitudinal axis 220 may be generally perpendicular to the second longitudinal axis 222, although it will be appreciated that the specific dimension of the angle 224 is not meant to be a limiting aspect of the disclosed concept. In addition, a conveyor belt (see, for example, conveyor belts 232,332 in FIG. 10) is structured to encircle the die assembly 200 (FIGS. 4 and 10)

and the inlet end 216 of the port member 210 is structured to extend outwardly from the vacuum manifold 206 generally perpendicular with respect to a plane (see, for example, plane 350 in FIGS. 9 and 10) of the conveyor belt 232,332 (FIG. 10). As a result, the size or height 226 of the vacuum manifold 206 is no longer a restriction on the size (e.g., diameter) of the inlet end 216 of the port member 210. Therefore, a larger conduit (partially shown in phantom line drawing in FIG. 5) from the airflow generator 108,110 (FIG. 10) can advantageously be coupled to the port member 210.

In other words, in the example of FIG. 5, the vacuum manifold 206 has a height 226, and the inlet end 216 has a diameter 228 that is substantially equal to the height 226 of the vacuum manifold 206. It is also within the scope of the disclosed concept, however, for the diameter of the inlet end 216 to be even larger than the height 226 of the vacuum manifold 206. The outlet end 218 in the non-limiting embodiment shown and described has a diameter 230 that is substantially the same as the diameter 228 of the inlet end 216. However, it is within the scope of the disclosed concept for the diameter 230 of the outlet end 218 to be different (e.g., larger) than the diameter 228 of the inlet end 216. In one non-limiting embodiment, the diameter 228 of the inlet end 216 and the diameter 230 of the outlet end 218 are, preferably between 0.5 and 2.5 inches, and more preferably between 1 inch and 2 inches. In the non-limiting example of FIG. 5, both diameters 228,230 are about 1.4 inches.

FIG. 6 shows another die assembly 300 and vacuum port assembly 302 for the press system 100 (FIG. 10), in accordance with the disclosed concept. Similar to die assembly 200 discussed above, a vacuum manifold 306 is coupled to a die shoe 304. The vacuum port assembly 302 includes three port members 308,310,312. However, it is within the scope of the disclosed concept for the vacuum port assembly 302 to include any suitable alternative number and/or configuration (not shown) of port members (e.g., 308,310,312).

For ease of illustration and economy of disclosure, only one of the port members 308,310,312 will be discussed in greater detail. Specifically, as seen in the exploded portion of FIG. 6, the port member 308 includes an inlet end 320 and an outlet end 322. The inlet end 320 has a mounting portion 324 that removably couples the port member 308 to the vacuum manifold 306. The port member 308 may be coupled by any known or suitable mechanism in the art. This is also true of all port members 208,210,308,310,312,400, 500 in accordance with the disclosed concept. For example, and without limitation, the mounting portion 324 in FIG. 6 includes a flange 326 and a fastening mechanism 328. The fastening mechanism 328 removably couples (e.g., fastens) the flange 326 to the vacuum manifold 306. The fastening mechanism 328 in FIG. 6 is a number of bolts 330 (two are shown) for bolting the flange 326 to the vacuum manifold 306. In this manner, the port member 308 can be quickly and easily removed by unfastening e.g., loosening) the fastening mechanism 328, and then cleaned and coupled back to the vacuum manifold 306, or, replaced altogether. For example, during operation, debris from the press system 100 (FIGS. 9 and 10), such as aluminum fines, lubrication, and/or coatings, can become trapped in the port members 308,310,312. Rather than completely disassembling the die assembly 300, vacuum manifold 306, and related components (not shown), the port members 308,310,312 can be quickly and easily removed and cleaned, or replaced with another port member of the same or a different type and/or configuration (not shown). This results in a significant reduction in down time and a substantial cost savings.

Figure 7A:
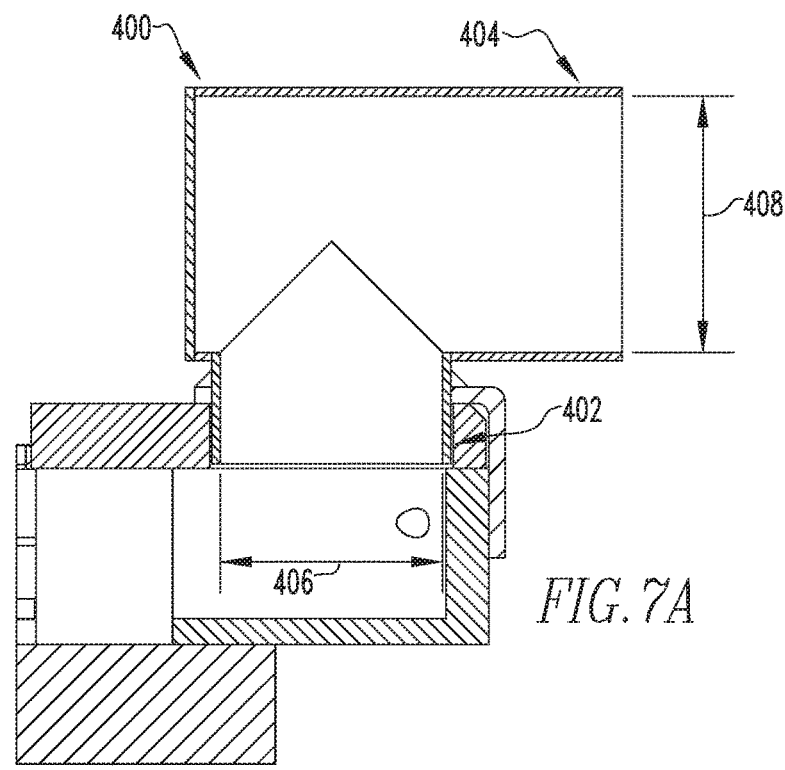
FIG. 7A is a section view of a port member, in accordance with another embodiment of the disclosed concept.
Figure 7B:
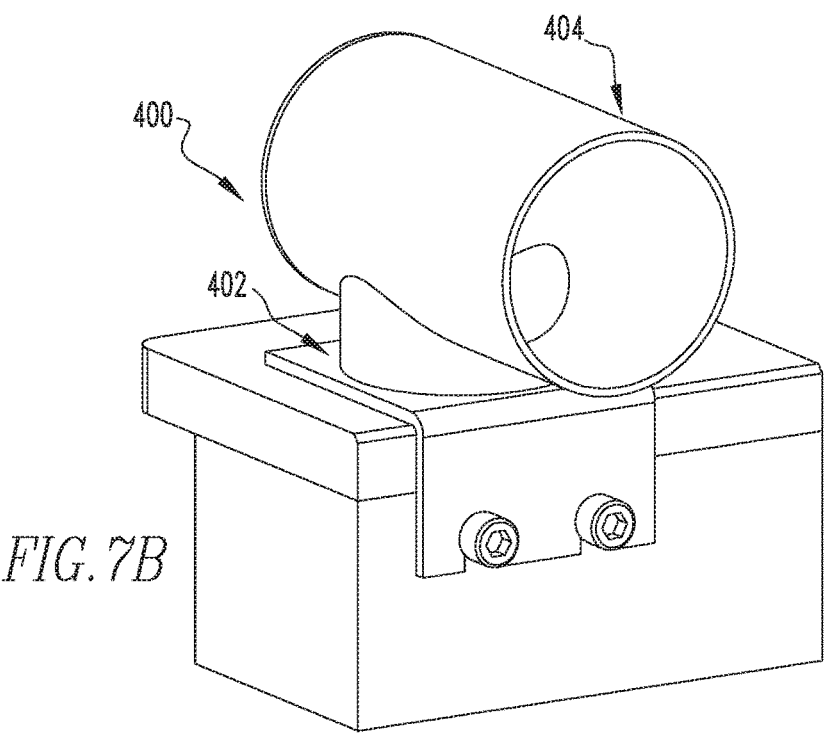
FIG. 7B is an isometric view of the port member of FIG. 7A.

FIGS. 7A and 7B illustrate an alternative, non-limiting embodiment of the disclosed concept. As seen, the example port member 400 has an inlet end 402 and an outlet end 404. The inlet end 402 has a diameter 406 that in one non-limiting embodiment is preferably about 1.6 inches and the outlet end 404 has a diameter 408 that in one non-limiting embodiment is preferably about 1.9 inches. However, it is within the scope of the disclosed concept for the inlet end 402 and the outlet end 404 to have any known or suitable alternative diameters.

Figure 8A:
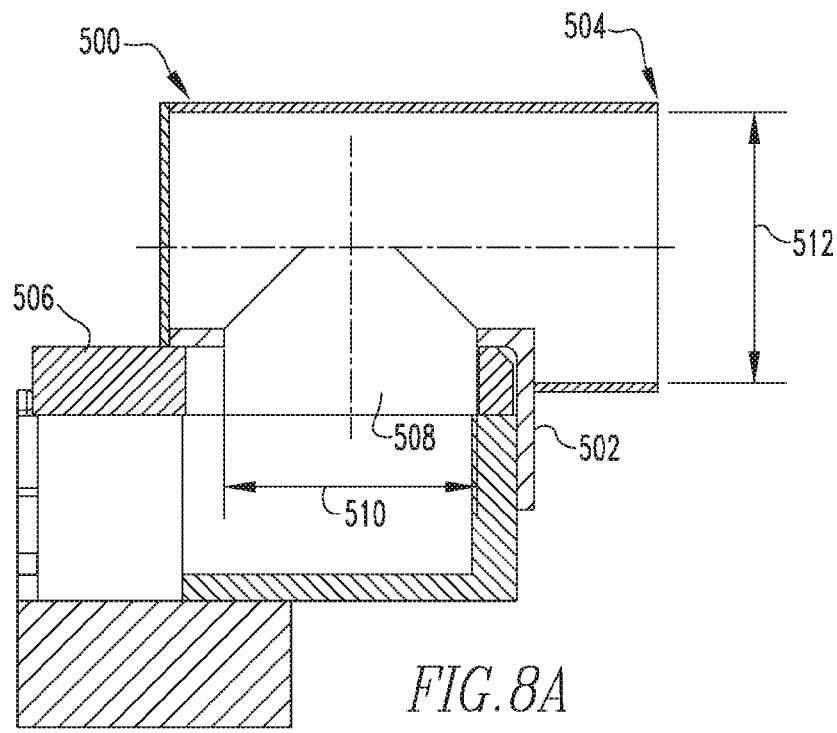
FIG. 8A is a section view of a port member, in accordance with a further embodiment of the disclosed concept.
Figure 8B:
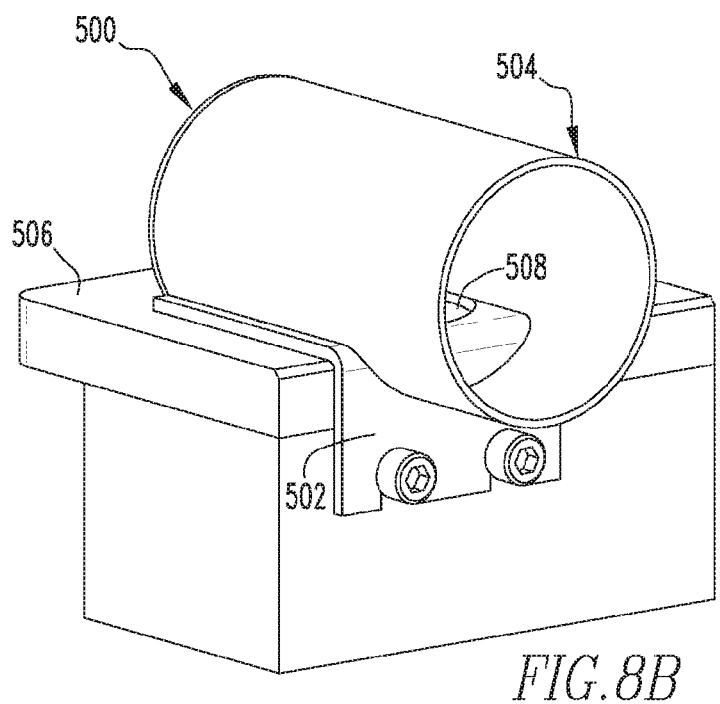
FIG. 8B is an isometric view of the port member of FIG. 8A.

FIGS. 8A and 8B represent an alternative port member 500, in accordance with another non-limiting embodiment of the disclosed concept. The example port member 500 has a flange 502 and an outlet end 504 that is built directly into the flange 502. This results in an additional reduction in volumetric air flow restriction between the airflow generator 108,110 (shown in simplified form in FIG. 10) and vacuum manifold 506, which in turn leads to improved vacuum pressure levels and improved holding forces. There is an opening 508 in the vacuum manifold 506 through which air travels. The opening 508 has a diameter 510 that in one non-limiting embodiment is preferably about 1.75 inches, but may be any known or suitable alternative size, without departing from the scope of the disclosed concept. The outlet end 504 has a diameter 512 that in one non-limiting embodiment is preferably about 1.9 inches, but may likewise have any known or suitable alternative size.

FIG. 9 shows an endless conveyor belt 332 that is structured to encircle the die assembly 300, between a pair of drums 334,336. Shells 104 (two shells 104 are shown in FIG. 9; see also shell 104 in FIG. 9A, and shells 104 shown in phantom line drawing in FIG. 10) are disposed in regularly spaced holes 338 in the conveyor belt 332 and carried by the conveyor belt 332 to tooling stations 340 within the press system 100 (partially shown), where the die assembly 300 (partially shown) progressively forms (e.g., converts) the shells 104.

FIG. 10 shows a larger portion of the aforementioned press system 100, including the vacuum port assembly 202 and die assembly 200, and vacuum port assembly 302 and die assembly 300. In the example of FIG. 10, the system 100 includes a transfer assembly 102 having two conveyor belts 232,332 with holes 238,338 that receive and move shells 104 (shown in phantom line drawing) in a plane 350 with respect to the die assemblies 200,300 to be formed thereby, as previously discussed. The transfer assembly 102 also includes airflow generators 108,110 (shown in simplified form) that are coupled, in fluid communication (schematically shown in FIG. 10), to respective port members 208, 210,308,310,312 by conduits 112,114 (shown in simplified form; see also conduit 600, partially shown in phantom line drawing in FIG. 5). In the example shown and described herein, the press system 100 is a four-out conversion press 100, although it will be appreciated that the disclosed concept could be employed with any known or suitable alternative type and/or configuration of press system (e.g., without limitation, shell press conversion press other than the four-out system 100, shown) (not shown), without departing from the scope of the disclosed concept.

The die assemblies 200,300 of the press system 100 comprise a pair of dies 205,305 (partially shown for ease of illustration) that include a plurality of tooling stations 240, 340 (partially shown for ease of illustration) and a plurality of port members 208,210,308,310,312. Additionally, the vacuum port assemblies 202,302 of the example press system 100 are coupled by conduits 112,114 to the airflow generators, which in the example shown and described are regenerative blowers 108,110, to create the desired vacuum pressure within the vacuum manifolds 206,306. As previously discussed, the vacuum pressure maintains the shells 104 in the desired predetermined position with respect to the conveyor belts 232,332, as the shells 104 are moved through the tooling stations 240,340, which progressively form (e.g. convert) the shells 104 into completed can ends (not shown).

Accordingly, the disclosed concept provides an improved vacuum port assembly 202,302 for a press system 100, which among other benefits, is quickly and easily removable, for example, for ease of maintenance, and operating adjustments, and also enables larger diameter port members to be employed for enhanced performance.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A press system comprising:
   a die assembly;
   a transfer assembly comprising a conveyor belt, a vacuum manifold coupled to the die assembly, an airflow generator, the conveyor belt including a plurality of holes and being structured to receive and move a plurality of shells in a plane with respect to the die assembly; and
   a vacuum port assembly comprising:
      at least one port member including an inlet end and an outlet end, the inlet end having a mounting portion, the mounting portion removably coupling the at least one port member to the vacuum manifold, the outlet end being in fluid communication with the airflow generator, in order that the at least one port member establishes fluid communication between the airflow generator and the vacuum manifold,
      wherein the inlet end extends outwardly from the vacuum manifold generally perpendicular with respect to the plane of the conveyor belt; wherein the mounting portion includes a flange and a fastening mechanism; and wherein the fastening mechanism removably couples the flange to the vacuum manifold.

2. The press system of claim 1 wherein the fastening mechanism is a number of bolts; and wherein the flange is bolted to the vacuum manifold.

3. The press system of claim 1 wherein the inlet end has a first longitudinal axis; wherein the outlet end has a second longitudinal axis; and wherein the first longitudinal axis is generally perpendicular to the second longitudinal axis.

4. The press system of claim 1 wherein the at least one port member comprises at least two port members.

5. The press system of claim 4 wherein all of the port members are substantially identical.

6. The press system of claim 1 wherein the press system is a conversion press; wherein the die assembly comprises a plurality of dies; wherein the dies include a plurality of tool stations; wherein the vacuum port assembly further comprises a plurality of conduits; wherein the airflow generator is a plurality of blowers; wherein each of the dies includes a plurality of port members; wherein the conduits connect each of the port members in fluid communication with a corresponding one of the blowers to create vacuum pressure within the vacuum manifold; wherein the vacuum pressure maintains the shells in a desired position with respect to the conveyor belt; and wherein the conveyor belt moves the shells with respect to the dies in order that the tool stations progressively form the shells into completed can ends.

7. A press system comprising:
   a die assembly;
   a transfer assembly comprising a conveyor belt, a vacuum manifold coupled to the die assembly, an airflow generator, the conveyor belt including a plurality of holes and being structured to receive and move a plurality of shells in a plane with respect to the die assembly; and
   a vacuum port assembly comprising:
      at least one port member including an inlet end and an outlet end, the inlet end having a mounting portion, the mounting portion removably coupling the at least one port member to the vacuum manifold, the outlet end being in fluid communication with the airflow generator, in order that the at least one port member establishes fluid communication between the airflow generator and the vacuum manifold,
      wherein the inlet end extends outwardly from the vacuum manifold generally perpendicular with respect to the plane of the conveyor belt; wherein the vacuum manifold has a height; wherein the inlet end has a first diameter; wherein the outlet end has a second diameter; and wherein the first diameter is substantially equal to or larger than the height of the vacuum manifold.

8. The press system of claim 7 wherein the first diameter is substantially the same as the second diameter.

9. The press system of claim 7 wherein the first diameter is between 0.5 inches and 2.5 inches.

* * * * *